United States Patent [19]

Walters

[11] Patent Number: 5,098,990
[45] Date of Patent: Mar. 24, 1992

[54] METHOD FOR MAKING POLYESTERS, POLYAMIDES AND POLYKETONES

[75] Inventor: Marlin E. Walters, West Columbia, Tex.

[73] Assignee: The Dow Chemical Company, Midland, Mich.

[21] Appl. No.: 99,933

[22] Filed: Sep. 23, 1987

Related U.S. Application Data

[63] Continuation-in-part of Ser. No. 866,852, May 23, 1986, abandoned, which is a continuation-in-part of Ser. No. 740,451, Jun. 3, 1985, abandoned.

[51] Int. Cl.$^5$ .............................................. C08G 83/00
[52] U.S. Cl. ..................................... 528/220; 528/226; 528/229
[58] Field of Search ....................... 528/220, 226, 229

[56] References Cited

U.S. PATENT DOCUMENTS 4,762,909  8/1988  Walters ............................... 528/220

Primary Examiner—Maurice J. Welsh

[57] ABSTRACT

A new process for making polyesters, polyamides and polyketones which comprises reacting a dihydric alcohol, a diamine or a diacylaromatic compound with a bis(trichloromethylketone) compound and in the presence of a basic catalyst, as necessary.

31 Claims, No Drawings

METHOD FOR MAKING POLYESTERS, POLYAMIDES AND POLYKETONES

CROSS-REFERENCE TO RELATED APPLICATION

This application is a divisional of Ser. No. 866,852, filed May 23, 1986, now abandoned which is continuation-in-part of copending application Ser. No. 740,451 filed June 3, 1985 and now abandoned.

BACKGROUND OF THE INVENTION

Polyesters are heterochain macromolecular compounds that contain carboxylic ester linkages in the chain as opposed to other polymers containing ester groups which are pendant from the chain such as poly (acrylates) and poly(vinyl esters). Polyesters can be made from (1) the reaction of diols with dicarboxylic acids, by (2) the intermolecular polymerization of hydroxycarboxylic acids and by (3) ring-opening polymerizations of lactone and cyclic esters. The first produces an AABB type polyester while the latter two produce the AB type polymer. Catalysts used in direct esterification reactions as in the above, when needed to maintain the self-catalyzed reaction, are sulfonic acids, e.g., toluenesulfonic, phosphoric acid and dialkyltin oxides. Strongly acidic catalysts, however, tend to discolor the product and must be removed from it. Instead of the above reactants which contain carboxylic or dicarboxylic acid groups, similar compounds in which carbonyl or dicarbonyl chlorides replace the carboxylic acid groups can also be used to react with the hydroxyl groups. The by-product is hydrogen chloride. Transesterification of diesters of monohydric alcohols with dihydric alcohols is yet another method of obtaining the polyesters.

In the use of carbonyl chlorides the by-product acid must be absorbed and disposed of while the monohydric alcohol by-product in the transesterification reaction must be removed or poor yields or low molecular weight polyester may result.

Polyamides are normally thought of as condensation products formed by the intramolecular reaction of difunctional amino acids or between dibasic acids and diamines. The former reaction produces an AB-type polymer and the latter an AABB-type. The polyamides are frequently referred to generically as nylons. Polyamides can also be prepared by the addition of an amine to an activated double bond, e.g. an unsaturated amide. Diamines can also be reacted with diamides to give polyamides. The use of diacid chlorides in place of the dicarboxylic acids to react with the diamine is another route to polyamides. Yet another method of preparing the polyamides is by the reaction of diacids with diisocyanates. The by-products of these latter methods is an acid or salt which generates a disposal problem. Also involved is the handling of toxic materials in the case of using diisocyanates.

It has now been found that polyesters and polyamides can be made without the corrosive HCl or undesirable monohydric alcohols as by-products of the polyester reaction or without the by-product acid or salt or the handling of the toxic reactants in the polyamide reaction. The polyesters and polyamides can now be made by reacting a bis(trichloromethylketone) compound with a dihydric alcohol and a diamine, respectively.

Thus, for example, a bisphenol can be reacted with bis(trichloroacetyl)phenyl ether in the presence of a basic catalyst to obtain a polyester.

Polyketones can also be made by the process of this invention by reacting the bis(trihaloacetyl)aromatic compounds with bis(acyl)aromatic compounds to form the polyketones. The polyketones made thereby are poly-$\beta$-diketones, products not heretofore made, and, thus, new compounds. No reference to such polymers has been found in the literature.

SUMMARY OF THE INVENTION

The present invention is a new process for making polyesters, polyamides and polyketones which comprises reacting a dihydric alcohol, a diamine or a diacylaromatic compound with a bis(trichloromethylketone) compound and in the presence of a basic catalyst, as necessary.

DETAILED DESCRIPTION OF THE INVENTION

The new method for making polyesters, polyamides and polyketones employs non-corrosive, non-water-sensitive bis(trichloromethylketone) compounds and dihydric alcohols, diamines or diacylaromatic compounds. This eliminates the problems associated with acid chlorides and the presence of monohydric alcohols. In the case of polyamides the by-product acid and salts as well as the toxic starting materials are eliminated. The by-product chloroform is non-corrosive and easily removed from the product and causes no reduction in molecular weight of the product.

A typical polyester reaction is shown by the following structural formulae:

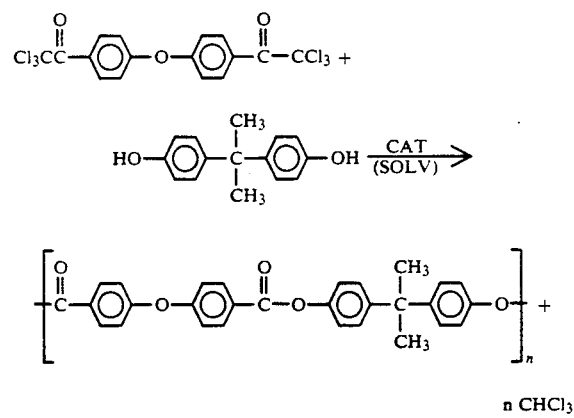

A typical polyamide reaction is shown as follows:

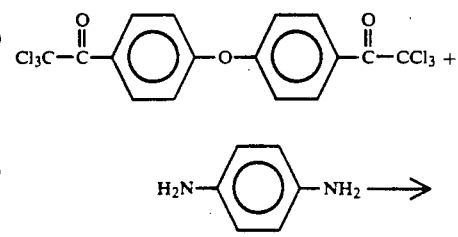

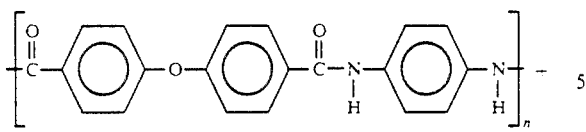 5

+ n CHCl₃

To make polyketones the bis(trichloromethylketone)aromatic compound is reacted with a bis(acyl)aromatic compound as shown by the following equation:

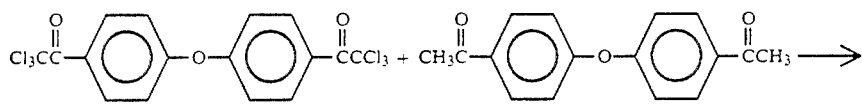

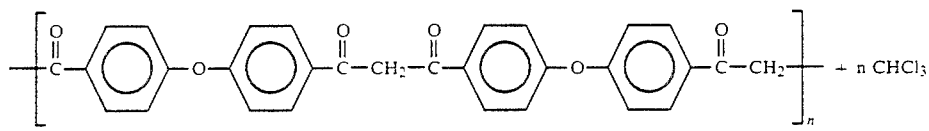
+ n CHCl₃

The reactants, in any case, are mixed together, with adequate stirring, in a suitable vessel either neat, in melt, or in a solvent A catalyst is added (if necessary), then the mixture is warmed to the desired reaction temperature. The product is precipitated, washed with water, and isolated by filtration.

The aromatic bis(trichloromethylketone) compound useful in the polymerization reaction have the formula:

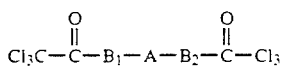

wherein $B_1$ and $B_2$ are independently selected from

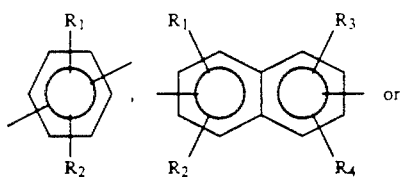

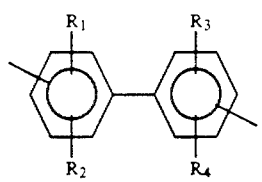

and which may be the same or different and wherein $R_1$, $R_2$, $R_3$ and $R_4$ are independently selected from the group consisting of hydrogen, chlorine, bromine, an alkyl or an akoxy group having from 1 to 4 carbon atoms, a pheny group or substituted phenyl group

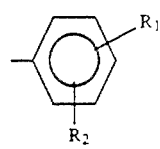

wherein $R_1$ and $R_2$ have the aforesaid meaning, and A is a single valence bond, oxygen, sulfur,

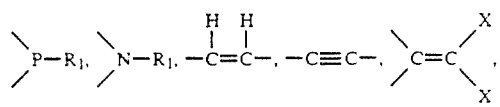

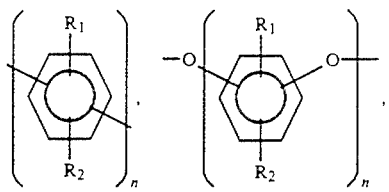

an aromatic group having the formula

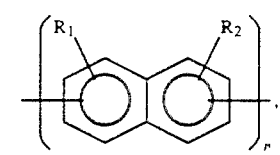

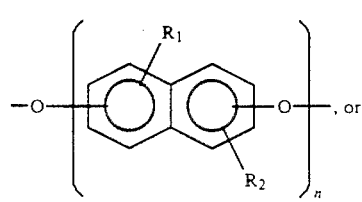

, or

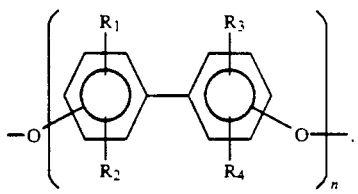

X is chlorine or bromine, $R_1$, $R_2$, $R_3$ and $R_4$ having the aforesaid meanings and wherein n is an integer from 1 to 6.

Representative of the bis(trichloromethylketone) compounds are 4,4'-bis(trichloroacetyl)phenyl ether, 1,4-bis(trichloroacetylphenoxy)benzene, bis(trichloroacetyl)biphenyl, bis(trichloroacetyl)phenoxybiphenyl, 4,4'-bis(trichloroacetyl)3-methyldiphenyl ether), 4,4'-bis(trichloroacetyl)diphenylmethane, 1,1-bis(4-[4-(trichloroacetyl)phenoxy]phenyl)-2,2,2-trichloroethane, 4,4'-bis[4-(trichloroacetyl)phenoxy]diphenylmethane.

Representative of the dihydric alcohols for the polyester reaction are bisphenol A (p,p'-isopropylidene diphenol), resorcinol, hydroquinone, [1,1'-biphenyl]-4,4'-diol, 1,5-dihydroxynaphthalene, 1,1-dichloro-2,2-bis(4-hydroxyphenyl)ethylene, 1-(4-hydroxyphenyl)-1,3,3-trimethyl-7-hydroxyindane, 4,4'-dihydroxyphenyl ether, 1,4-dihydroxy anthraquinone, 3,3',5,5'-tetramethyl-4,4'-dihydroxybiphenyl, 1,4-cyclohexanediol; also alkylene glycols. e.g. ethylene and propylene glycols, 1,4-butanediol and polyols.

Representative of the diamines used to form the polyamides are ethylene diamine. 1,6-diaminohexane, propylene diamine, 4,4'-diaminobiphenyl, p-phenylenediamine, m-phenylenediamine, (toluenediamine)2,4-diaminotoluene, 1,5-diaminonaphthalene, 4,4'-methylenedianiline, aminophenyl sulfone (diaminodiphenylsulfone), 4,4'-diaminodiphenylamine, 4,4'-diaminophenyl ether, 1,6-hexanediamine, 1,4-butanediamine, piperazine, aminoethylpiperazine, 1,4-cyclohexanediamine, 4,4'-trimethyenedipiperidine and bis(amino)polyglycols.

Representative diacyl aromatic compounds used to form the polyketones are the diacetylbenzenes (o-, m- or p-), 4,4'-bis(acetyl)phenyl ether, 1,4-bis(acetylphenoxy)benzene, bis(acetyl)phenoxybiphenyl, 4,4'-diacetylbiphenyl, 2,3-butanedione, 4,4'-bis(acetyl)diphenylmethane, 4,4'-bis(acetyl)diphenyl-2,2-propane and 4,4'-bis(acetyl)3-methyldiphenyl ether.

The reaction to make the polyesters, polyamides and polyketones is generally conducted in the presence of a basic catalyst. If, however, the reactant amine is sufficiently basic, no catalyst is required.

While the reaction can be conducted in a melt of the reactants, a polar aprotic solvent is frequently used to advantage. Representative of such solvents useful in the reaction include tetrahydrofuran (THF), sulfolane, γ-butyrolactone, dimethylsulfoxide (DMSO), dimethylacetamide, dimethylformamide (DMF), hexamethylphosphoramide (HMPA) and N-methylpyrrolidone.

The Catalysts useful in the reaction are basic catalysts. Alkali metal hydrides, e.g. NaH, can be employed and also tertiary amines, such as trialkyl amines, e.g. triethyl amine. Other tertiary amines which are useful catalysts include 1,4-diazobicyclo[2.2.2]-octane, 1,5-diazobicyclo[4.3.0]non-5-ene and dimethylaminopyridine. Lithium alkyls and amides, e.g. butyl lithium and diisopropyl lithium amide, are also good catalysts for the reaction.

The reaction may be conducted over a broad temperature range from about $-100°$ C. to about $+200°$ C., preferably from about $-45°$ C. to about $+85°$ C. One of the advantages of this process is the low temperature at which it may be conducted, thus avoiding decomposition which can occur at higher temperatures.

Another advantage is the time needed for the reaction to take place which will vary with the temperature, the reactivity of the alcohols, the particular trichloromethylketone compounds employed and the catalyst used, if any, but it is generally accomplished in from about 1 minute to 24 hours and preferably from about 6 minutes to about 12 hours. The reaction is normally very rapid at room temperatures and requires less than an hour, usually only a few minutes.

Temperatures and times outside these ranges generally result in little or no reaction or poor yields due to incomplete reaction or decomposition of the products.

Pressures may be employed within the range of from about 20 to 760 mm Hg. Higher pressure can be employed, but is of no particular advantage. The pressure employed is not a critical variable.

The molecular weights of the polymers normally prepared according to the method of the present invention may vary from about 1,000 to about 10,000,000 depending primarily upon the ratios and purity of the reactants. When one employs a stoichiometric ratio of the bis(trichloroacetyl)aromatic compound to that of the dihydroxy compound the diamine or the bis(acyl)aromatic compound and the reactants are very pure one can obtain very high molecular weights. The lower molecular weights normally desired are obtained when an excess of one reactant over the other is employed. The very high molecular weight polymers are insoluble.

The poly-β-diketones made by the present process have the following formula:

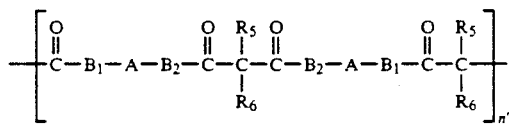

wherein A, $B_1$ and $B_2$ have the previously assigned meanings and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000.

Copolymers prepared by reacting bis(trihaloacyl)-aromatic aromatic compounds with monomers in which the benzene ring contains either an amino or hydroxy group in addition to an acyl group or two acyl groups will have the following formulae:

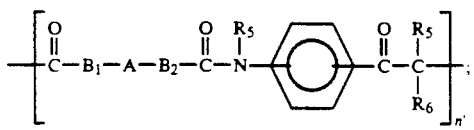

-continued

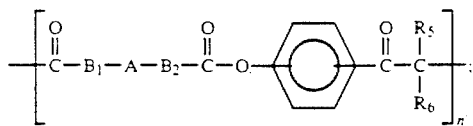

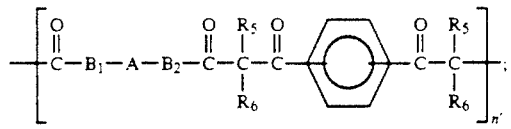

wherein A, $B_1$, $B_2$, $R_6$ n' have the aforesaid meanings.

The reaction disclosed herein can also be used to prepare homopolymers if the monomer used contains a trihaloacyl group and a hydroxy, an amino or an acyl group in the same molecule. The formula for such monomers useful in making the homopolymers would appear thus:

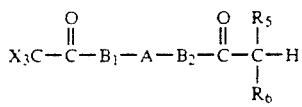

wherein A, $B_1$, $B_2$ and X have the meaning previously ascribed and $R_5$ and $R_6$ are independently selected from hydrogen, fluorine, chlorine, bromine, alkyl groups having from 1 to 6 carbon atoms, which may be straight chain or branched, or phenyl, Other monomers have the formulae:

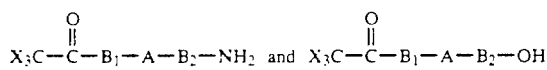

wherein the letter designations have the same meanings as above.

Another formula for compounds not covered by the above from which homopolymers can be made is

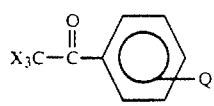

wherein X is chlorine or bromine and Q can be a hydroxy, an amine or an acyl group and wherein Q may be ortho-, meta- or para- to the trihaloacyl group. Compounds covered by the above formula include trichloroacetyl phenols, trichloroacetyl anilines and trichloroacetyl acylbenzenes, wherein the acyl group is

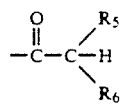

wherein $R_5$ and $R_6$ have the aforesaid meaning.

A homopolymer containing the β-diketone linkage made from a trihaloacyl acyl benzene will have the formula:

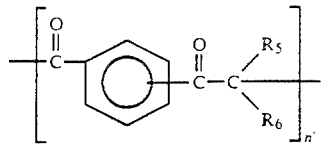

wherein $R_5$, $R_6$ and n' have the aforesaid meanings.

It should be noted that, in order for reaction to occur with the trihaloacetyl group, the carbon o to the carbonyl group must contain a hydrogen atom.

In another aspect of the invention a compound containing three or more of any of the functional groups can be employed in small amounts along with the other reactants to form crosslinked polymers. Thus, tris(trichloroacetyl)benzene, dihydroxyaniline, trihydroxybenzene, triaminobenzene, triacylbenzene and the like can be used to obtain crosslinked polymers according to the invention.

The following are representative examples of the preparation of the polyesters, polyamides and polyketones according to the invention.

POLYESTERS

Example 1

The bis-4,4'-(trichloroacetyl)phenyl ether (0.050 mole, 23.02 g) and bisphenol A (.050 mole, 11.4 g) were weighed into a 500 ml resin flask and THF* (50 ml) added. Stirring was commenced and sodium hydride (.008 mole, .192 g) was added as the catalyst. The solution became very viscous after 3 minutes, so the mixture was heated to 50° C. and allowed to stir overnight. The mixture was allowed to cool, 100 ml THF added, and then 100 ml of .1 N HCl. The polymer precipitated at once, a pale yellow mass. Repeated washing with water gave a white solid which when dried in vacuo, gave 20.72 g (92% yield) of a very hard, tough, white mass. The polymer was shown to have a weight average molecular weight of 34,287** with a dispersity of 4.6 by gel permeation chromatography (GPC), using THF as the solvent.

* THF=tetrahydrofuran
** Molecular weight is relative to polystyrene standards.

EXAMPLE 2

Polymerization of bis-4,4'-(trichloroacetyl)phenyl ether with 4,4'-dihydroxybiphenyl.

The bis-4,4'-(trichloroacetyl)phenyl ether (46.06 g, 0.10 mole) and the 4,4'-dihydroxy biphenyl (18.62 g, 0.10 mole) were weighed into a 500 ml resin flask and 200 ml THF added. The mixture was brought to 60° C. and NaH (.005 mole, .20 g) added all at once. After the foaming had subsided, a gradual increase in viscosity was observed until the stirring motor stalled. More THF (100 ml) was added and the mixture allowed to stir overnight. The mixture was poured into .03 N HCl (300 ml) and the polymer (a fine white powder) collected by filtration yielding 40.9 g of a very fine white powder which was insoluble in all solvents. The polymer showed a glass transition temperature by differential scanning calorimeter (DSC) of 254.5° C.

EXAMPLE 3

Polymerization of bis-4,4'-(trichloroacetyl)phenyl ether with ethylene glycol.

This polymerization was performed as in the above example by weighing the reactants 4,4'-bis(trichloroacetyl)phenyl ether (.20 mole, 92.19 g), ethylene glycol (.20 mole, 12.41 g) and solvent (THF, 200 ml) into a 500 ml resin flask, bringing the mixture to 55° C. and adding the catalyst (NaH, .006 mole, .144 g). After stirring overnight the mixture was poured into acidic methanol and the polymer collected by filtration as a fine white powder, 55.76 g. DSC showed the polymer to have a glass transition temperature (Tg) of 116.7° C. and a crystalline melt temperature (Tm) of 158.8° C.

EXAMPLE 4

Polymerization of bis-4,4'-(trichloroacetyl)phenyl ether with tetraethylene glycol.

This polymerization was performed as in the above example by weighing the reactants 4,4'-bis(trichloroacetyl)phenyl ether (.20 mole, 92.19 g) and tetraethylene glycol (.20 mole, 38.84 g) into a 500 ml resin flask. THF (200 ml) was added and the mixture brought to 55° C. NaH (.006 mole, .144 g) was added and the mixture stirred overnight. The mixture was poured into acidic methanol and the polymer collated on a filter as a very viscous resin 77.91 g (93%).

EXAMPLE 5

Polymerization of 1,4-bis(p-trichloroacetyl-phenoxy)-benzene with bisphenol A.

The 1,4-bis(p-trichloroacetyl-phenoxy)benzene (0.05 mole, 27.65 g) and bisphenol A (0.050 mole, 11.41 g) were weighed into a 500 ml resin flask and THF (50 ml) added. Stirring was begun and the mixture brought to 65° C. NaH (.0038 mole, .09 g) was added as catalyst and the solution allowed to stir for 10 hours. The mixture was poured into .03 N HCl (300 ml) and the polymer, a fine white powder, collected by filtration 27.01 g (99.5%). DSC showed the polymer to have a Tg of 189° C.

A series of polymerizations was carried out as in Example 1 in which the ratios of the reactants 4,4'-bis(trichloroacetyl)phenyl ether and bisphenol A were systematically varied while all other conditions were maintained the same. Table I shows the mole ratio of reactants used and the molecular weights obtained by GPC analysis.

TABLE I

| 4,4'-Bis(trichloroacetyl)phenyl ether/Bisphenol A Mole/Mole | Molecular Weight* |
| --- | --- |
| .978/1.000 | 51,218 |
| .985/1.000 | 64,106 |
| 1.000/1.000 | 79,962 |
| 1.017/1.000 | 70,745 |
| 1.111/1.000 | 17,215 |
| 1.200/1.000 | 10,830 |

*Weight average molecular weight relative to polystyrene standards.

POLYAMIDES

Example 6

Polymerization of 4,4'-bis(trichloroacetyl)phenyl ether with 4,4'-methylenedianiline.

The compound 4,4'-bis(trichloroacetyl)phenyl ether (11.5 g, 0.025 mole) and 4,4'-methylenedianiline (4.96 g, 0.025 mole) were weighed into a 500 ml resin pot and 50 ml of tetrahydrofuran (THF) was added. Diazo[2.2.2-]bicyclooctane (.224 g, .002 mole) was added as catalyst and the mixture brought to reflux. The mixture was stirred for 4 hours, then cooled and filtered. The solid was washed with THF (200 ml) and water (200 ml) then dried in a vacuum oven overnight, leaving 10.0 g of a cream-colored powder (95.2%) yield) m.p. >360° C.

Example 7

Polymerization of 4,4'-bis(trichloroacetyl)phenyl ether with 1,4-phenylenediamine.

The 4,4'-bis(trichloroacetyl)phenyl ether (.025 mole, 11.5 g) and 1,4-phenylenediamine (.025 mole, 2.70 g) were weighed into a 500 ml resin pot and THF (250 ml) added and the mixture brought to reflux. Triethylamine (.35 mole, 36.3 g) was added as catalyst and co-solvent and the reaction mixture was allowed to stir at reflux overnight. The mixture was cooled, then filtered and the collected solid washed with THF (200 ml) methanol (200 ml) and water (200 ml) then dried in a vacuum oven, leaving 8.07 g (98.0%) of a cream colored powder m.p. >360° C.

Example 8

Polymerization of 4,4'-bis(trichloroacetyl)phenyl ether with piperazine.

The 4,4'-bis(trichloroacetyl)phenyl ether (.20 mole, 92.19 g) was weighed into a resin flask equipped with a mechanical stirrer, thermowell, condenser and $N_2$ source. Dimethylacetamide (DMA) (150 ml) was added and the mixture brought to 60° C. to dissolve the ketone. The piperazine (.20 mole, 17.23 g) was added in one portion with vigorous stirring. The temperature of the mixture rose at once and finally reached 105° C. after 6 minutes. The reaction mixture was allowed to cool, then poured into water (400 ml) and the polymer collected as a pale yellow powder 63.5 g (100%). The polymer was compression molded at 220° C. and 5000 lb/in$^2$. Differential scanning calorimetry (DSC) shows the Tg to be 202° C.

EXAMPLE 9

Polymerization of 4,4'-bis(trichloroacetyl)phenyl ether and aminoethylpiperazine.

This polymerization was performed as in the example above by weighing the 4,4'-bis(trichloroacetyl)phenyl ether (.20 mole, 92.19 g) and DMA (150 ml) into a 500 ml resin flask, bringing the mixture to 60° C. and adding the aminoethylpiperazine (.20 mole, 25.84 g). The polymer reaction mixture was allowed to cool, then poured into water (400 ml) and the polymer isolated as a gum which after drying was compression molded into flexible, ductile bars. DSC shows Tg to be 187° C. Thermal gravimetric analysis (TGA) shows the polyamide to be thermally stable having only 5% weight loss at 310° C.

The following example shows that copolymers containing both ester and amide groups can be made by reacting the bis(trichloroacetyl)phenyl ether with a mixture of both a bisphenol and a diamine.

EXAMPLE 10

Copolymerization of 4,4'-bis(trichloroacetyl)phenyl ether with bisphenol A and aminoethylpiperazine.

The 4,4'-bis(trichloroacetyl)phenyl ether (0.10 mole, 46.09 g) and bisphenol A (0.05 mole, 11.41 g) were weighed into a 500 ml resin pot and dissolved in 100 ml THF. The NaH (0.01 mole, .24 g) was added and the mixture allowed to stir for 15 minutes. The mixture was then warmed to 60° C. and the aminoethylpiperazine (0.05 mole, 6.46 g) added dropwise via syringe. The mixture was stirred at 65° C. overnight, then allowed to cool to room temperature, poured into isopropanol (400 ml) and the polymer collected on a filter paper. The pale yellow polymer was dried in vacuo at 110° C. and 5 mm for 17 hours leaving 53.0 g of polymer which was compression molded at 245° C. into flexible bars.

The following example shows the preparation of a poly-β-diketone by reacting a bis(trichloroacetyl)aromatic compound with a bis(acetyl)aromatic compound.

POLY-β-DIKETONES

Example 11

Polymerization of 4,4'-bis(trichloroacetyl)phenyl ether with 4,4'-bis(acetyl)phenyl ether.

In a 250 ml flask under $N_2$ diisopropylamine (.004 mole, 4.45 g) was dissolved in 100 ml THF and the solution cooled to $-70°$ C. in a dry ice/acetone bath. n-Butyllithium (.044 mole, 2.81 g, 1.6 M in hexane) was added via syringe while holding the temperature of the mixture below $-50°$ C. 4,4'-bis(acetyl)phenyl ether (.020 mole, 5.09 g) in 20 ml THF was added dropwise to this mixture with stirring while allowing the temperature to rise to $-30°$ C. After stirring at $-30°$ C. for 30 minutes 4,4'-bis(trichloroacetyl)phenyl ether (0.020 mole, 9.22 g) in 20 ml THF was added via syringe. When the addition was complete the mixture was allowed to stir and warm to room temperature overnight, then poured into 500 ml of .01 N HCl, the precipitate collected on a filter and washed with water (300 ml) and acetone (300 ml). The polymer was compression molded at 255° C./ 5000 psi and has a Tg = 179° C. and Tm = 323° C. by DSC.

In a similar manner a mixture of bis(acetyl)phenyl ether and a bisphenol can be reacted with the bis(trichloroacetyl)aromatic compound to give a copolymer containing both ester and ketone groups in the polymer chain. The following example shows the preparation of such a copolymer.

Example 12

Copolymerization of 4,4'-bis(trichloroacetyl)phenyl ether with 4,4'-bis(acetyl)phenyl ether and bisphenol A.

The NaH (.04 mole, 0.96 g) was weighed into a 500 ml resin flask and 25 ml THF added. The 4,4'-bis(acetyl)phenyl ether (.020 mole, 5.09 g) in 25 ml THF was added dropwise to the stirred NaH slurry over a 45 minute period. 4,4'-bis(trichloroacetyl)phenyl ether (.100 mole, 46.09 g) was then added in 50 ml THF and the mixture allowed to stir for 30 minutes. The bisphenol A (.080 mole, 18.26 g) was added in .25 ml held there for 1 hour, cooled to room temperature and poured into 500 ml of .1 N HCl with vigorous stirring precipitating the polymer. The polymer was collected by filtration and dried in vacuo yielding 43.4 g (95%) of a light orange powder. Differential scanning calorimetry (DSC) showed the Tg to be 192° C.

Other examples are given in Table II in which bis(trichloroacetyl)phenyl ether (TAPE) was reacted with each of a number of dihydroxy compounds. These are shown together with the reactant ratios, catalysts and solvents employed.

TABLE II

| Ex. No. | Dihydroxy Compound (mole) | TAPE* (mole) | Solvent | Catalyst NaH (mole) | Tg (°C.) | Tm (°C.) |
|---|---|---|---|---|---|---|
| 13 | 1,5-dihydroxynaphthalene | .10 | .10 | THF/HMPA** 3/1 | .008 | 224 | — |
| 14 | 1,4-dihydroxyanthraquinone | .05 | .05 | THF/HMPA 3/1 | .008 | 220 | — |
| 15 | (bisphenol structure with indane) | .037 | .037 | THF | .0025 | 186 | — |
| 16 | (bis-phenol with bicyclic center) | .171 | .171 | THF | .011 | 184 | — |
| 17 | hydroquinone | .10 | .10 | THF | .008 | 212 | — |

TABLE II-continued

| Ex. No. | Dihydroxy Compound (mole) | TAPE* (mole) | Solvent | Catalyst NaH (mole) | Tg (°C.) | Tm (°C.) |
|---|---|---|---|---|---|---|
| 18 | HO—⟨◯⟩—⟨◯⟩—OH | .10 | .10 | THF | .008 | — | 211 |
| 19 | HO—⟨◯⟩—C(=O)—⟨◯⟩—OH | .20 | .20 | THF | .03 | — | >400 |

*TAPE = 4,4'-Bis(trichloroacetyl)phenyl ether
**HMPA = hexamethylphosphoramide

The following examples show the reaction of another bis(trichloroacetyl) aromatic compound with bisphenol A to form a polymer. Bis(trichloroacetyl)biphenyl (TAB) alone and in combination with TAPE was reacted with bisphenol A in Examples 20 (a), (b) and (c).

The reactants were placed in a 500 ml round-bottom flask equipped with nitrogen purge, thermocouple, mechanical stirrer, and reflux condenser. After purging with $N_2$, dry tetrahydrofuran (THF) was added to dissolve the reactants. The temperature was raised to 60° C. and NaH in mineral oil was added. The flasks each exothermed to a reflux temperature of ~71° C. (the reflux temperature of the THF-chloroform azeotrope evolving) and then subsided. This temperature was held for about 2 hours and when the ketone absorption on an infrared analysis had disappeared, benzoyl chloride was added to stop the reaction and neutralize the catalyst. The polymer was precipitated in methanol when the reaction was complete. Table III below shows the amounts of reactants. In each case 0.144 g NaH in mineral oil and 100 ml of THF were used.

TABLE III

| Ex. No. | TAB | TAPE | BisA | Tg |
|---|---|---|---|---|
| 20(a) | 44.5 g<br>0.1 mole | — | 22.83 g<br>0.1 mole | ~237° C. 1st<br>~360° C. 2nd |
| 20(b) | 26.70 g<br>0.06 mole | 18.44 g<br>0.04 mole | 22.83 g<br>0.1 mole | ~240° C. 1st<br>— |
| 20(c) | 35.6 g<br>0.08 mole | 9.22 g<br>0.02 mole | 22.83 g<br>0.1 mole | ~244° C. 1st<br>— |

The polymers were increasingly insoluble (more crystalline) as the amount of TAB reactant increased.

I claim:

1. A process for making polyesters, polyamides, polyketones or polymers containing a mixture of any two or more of such functionalities by reacting (a) an organic compound containing at least one trichloromethylketone group functional with (b) an organic compound containing at least one hydroxyl, amino, or acyl group functional and wherein the reactant molecules contain at least two of said reacting functional groups.

2. The process of claim 1 wherein both the trichloromethylketone group and one of the hydroxyl, amino or acyl groups are in the same molecule.

3. The process of claim 1 wherein a bistrichloromethylketone compound is reacted with an organic compound containing two reacting hydroxyl, amino or acyl groups or mixtures thereof.

4. The process of claim 1 wherein (a) is a bis(trichloromethylketone) compound having the formula:

$$Cl_3CC(=O)—C—B_1—A—B_2—C(=O)—Cl_3$$

wherein $B_1$ and $B_2$ are independently selected from

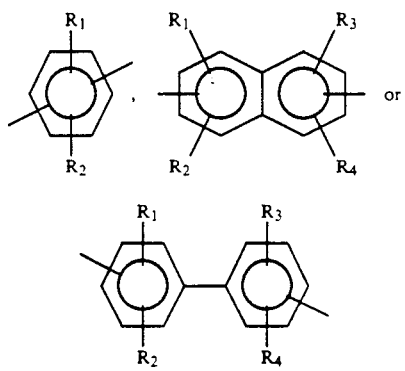

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl wherein $R_1$ and $R_2$ have the aforesaid meaning, and A is a single valence bond, oxygen, sulfur,

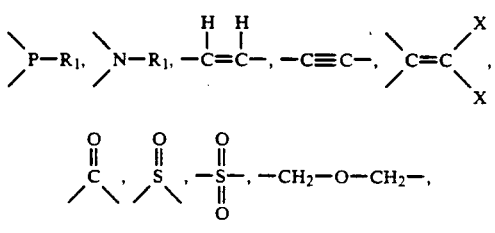

-continued

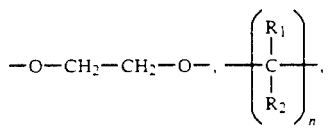

an aromatic group having the formula

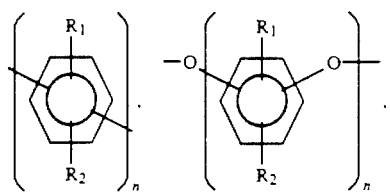

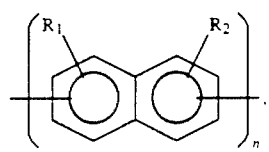

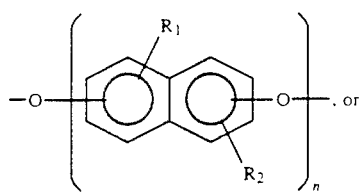

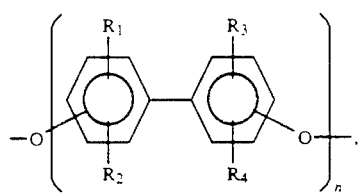

X, is chlorine or bromine $R_1$, $R_2$, $R_3$ and $R_4$ having the aforesaid meanings and wherein n is an integer from 1 to 6, and (b) is a dihydric alcohol, a diamine, a diacyl compound or a mixture thereof.

5. The process of claim 4 wherein the reaction is conducted in a solvent.

6. The process of claim 4 wherein the dihydric alcohol is a bisphenol, a glycol or a polyglycol.

7. The process of claim 6 wherein the bis(trichloromethylketone) compound is 4,4'-bis(trichloroacetyl)phenyl ether and the bisphenol is 4,4'-isopropylidene diphenol or 4,4'-dihydroxybiphenyl.

8. The process of claim 6 wherein the bis(trichloromethylketone) compound is 4,4'-bis(trichloroacetyl)phenyl ether and the glycol is monoethylene or monopropylene glycol.

9. The process of claim 6 wherein the bis(trichloromethylketone) compound is 4,4'-bis(trichloroacetyl)phenyl ether and the polyglycol is a polyethylene or polypropylene glycol.

10. The process of claim 9 wherein the polyethylene glycol is tetraethylene glycol.

11. The process of claim 4 wherein the bis(trichloromethylketone) compound is 4,4'-bis(trichloroacetyl)phenyl ether and the diacyl compound is diacetyl benzene, 4,4'-bis(acetyl)phenyl ether, 1,4-bis(acetylphenoxy)benzene, bis(acetyl)phenoxybiphenyl, 4,4'-bis(acetyl)diphenylmethane, 4,4'-bis(acetyl)diphenyl-2,2-propane, 4,4'-bis(acetyl)3-methyldiphenyl ether or 4,4-bis(acetyl)benzophenone.

12. The process of claim 4 wherein the bis(trichloromethylketone) compound is 4,4'-bis(trichloroacetyl)phenyl ether and the diamine is 4,4'-methylenedianiline, 1,4-phenylenediamine, piperazine, aminoethylpiperazine or a bis(amino)polyoxyalkyleneglycol.

13. The process of claim 4 wherein the reaction is conducted in the presence of a catalyst.

14. The process of claim 6 wherein the reaction is conducted in the presence of a basic catalyst.

15. The process of claim 7 wherein the reaction is conducted in the presence of a basic catalyst.

16. The process of claim 11 wherein the reaction is conducted in the presence of a basic catalyst.

17. The process of claim 12 wherein the reaction is conducted in the presence of a basic catalyst.

18. The process of claim 5 wherein the solvent is a polar aprotic solvent.

19. The process of claim 18 wherein the solvent is tetrahydrofuran, sulfolane, γ-butyrolactone, dimethylsulfoxide, dimethylformamide, dimethylacetamide or N-methylpyrrolidone.

20. The process of claim 4 wherein the reaction is conducted at a temperature of from about $-100°$ to about $+200°$ C.

21. The process of claim 20 wherein the reaction is conducted at a temperature of from about $-45°$ C. to about $+85°$ C.

22. The process of claim 4 wherein the reaction is conducted at a subatmospheric pressure.

23. The process of claim 22 wherein the pressure is at least about 20 mm Hg.

24. The process of claim 14 wherein the basic catalyst is an alkali or alkaline earth metal hydride, a tertiary alkyl amine or an alkali metal alkyl or amide.

25. The process of claim 15 wherein the basic catalyst is an alkali or alkaline earth metal hydride, a tertiary alkyl amine or an alkali metal alkyl or amide.

26. The process of claim 16 wherein the basic catalyst is an alkali or alkaline earth metal hydride, a tertiary alkyl amine or an alkali metal alkyl or amide.

27. The process of claim 17 wherein the basic catalyst is an alkali or alkaline earth metal hydride, a tertiary alkyl amine or an alkali metal alkyl or amide.

28. Polymers containing the β-diketone and amide linkages having the formula

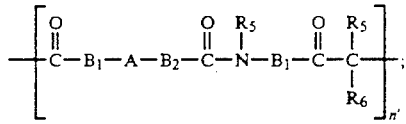

wherein $B_1$ and $B_2$ are independently selected from

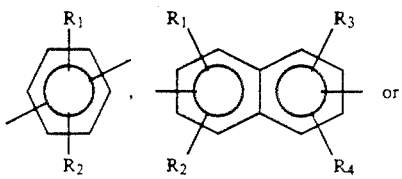

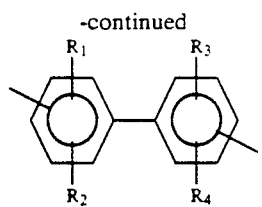

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl.

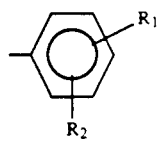

wherein $R_1$ and $R_2$ have the aforesaid meaning, and A is a single valence bond, oxygen, sulfur,

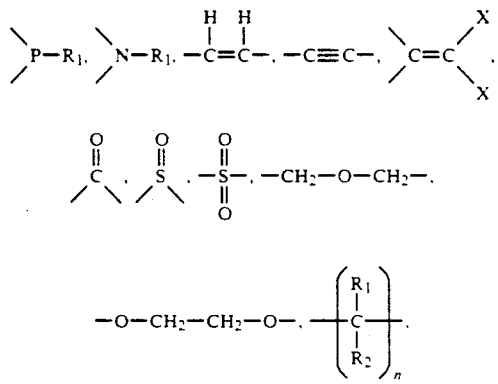

an aromatic group having the formula

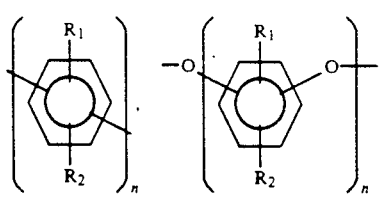

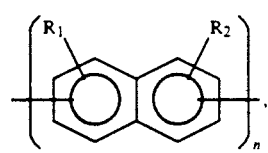

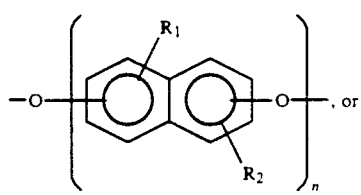

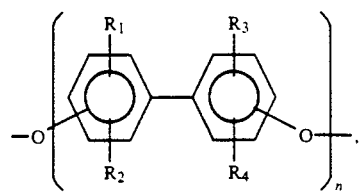

wherein X is chlorine or bromine and $R_1$, $R_2$, $R_3$ and $R_4$ have the aforesaid meanings, and wherein n is an integer from 1 to 6, and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000.

29. Polymers containing the β-polyketone and ester linkages having the formula

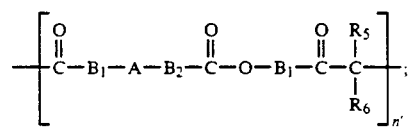

wherein $B_1$ and $B_2$ are independently selected from

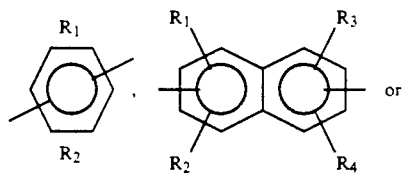

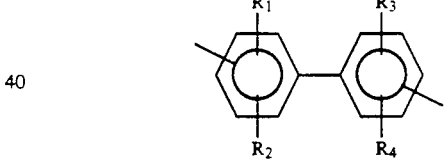

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl

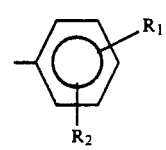

wherein $R_1$ and $R_2$ have the aforesaid meaning, and A is a single valence bond, oxygen, sulfur,

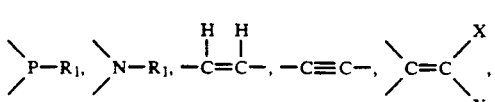

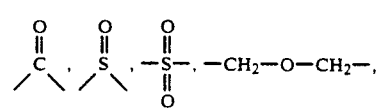

-continued

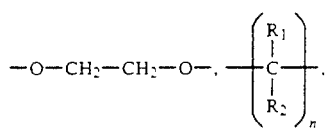

an aromatic group having the formula

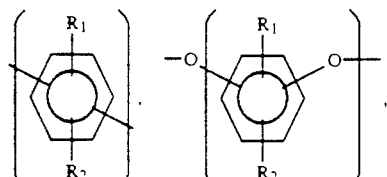

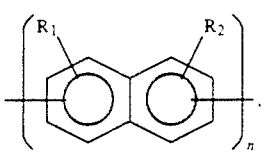

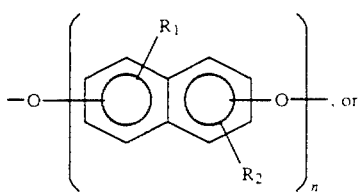

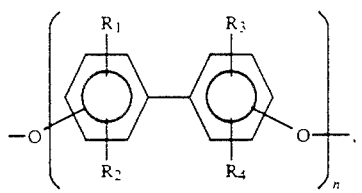

wherein X is chlorine or bromine and $R_1$, $R_2$, $R_3$ and $R_4$ have the aforesaid meanings, and wherein n is an integer from 1 to 6, and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000.

30. Polymers containing both β-diketone and ester linkages having the formula

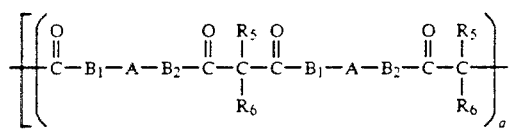

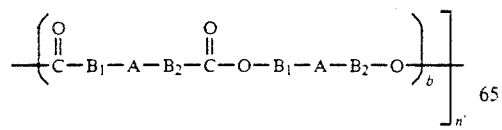

wherein $B_1$ and $B_2$ are independently from

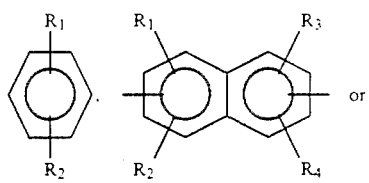

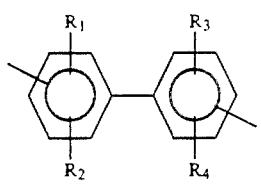

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl

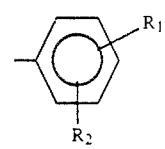

wherein $R_1$ and $R_2$ have the aforesaid meaning, and A is a single valence bond, oxygen, sulfur,

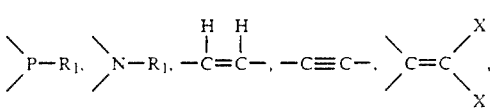

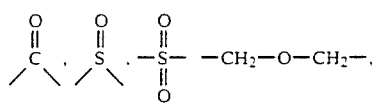

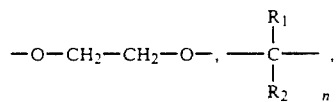

an aromatic group having the formula

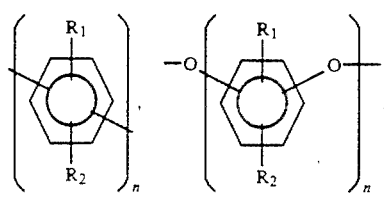

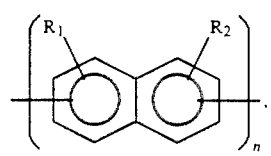

-continued

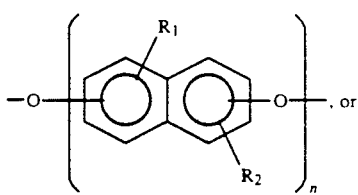

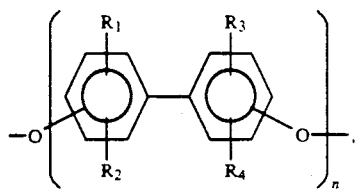

wherein X is chlorine or bromine and $R_1$, $R_2$, $R_3$ and $R_4$ have the aforesaid meanings, and wherein n is an integer from 1 to 6, and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000, and wherein a and b are integers having a ratio of from about 1 to 100 to 100 to 1 and wherein the a and b moieties can occur randomly or in block form.

31. Polymers containing both β-diketone and amide linkages having the formula

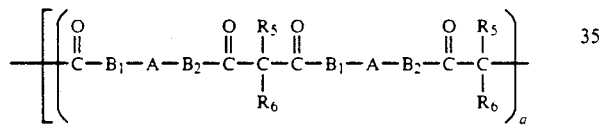

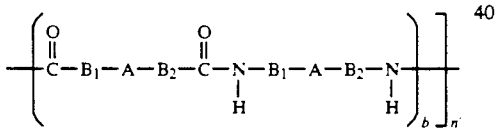

wherein $B_1$ and $B_2$ are independently selected from

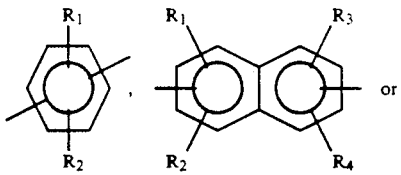

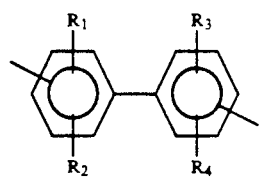

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl

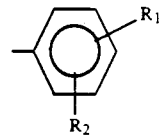

wherein $R_1$ and $R_2$ have the aforesaid meaning, and A is a single valence bond, oxygen, sulfur,

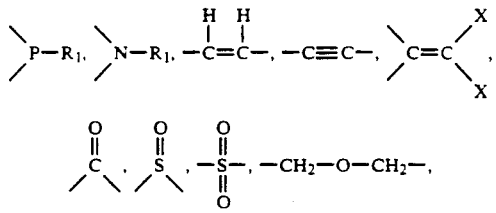

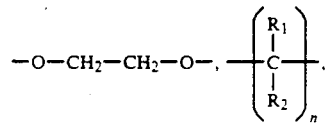

an aromatic group having the formula

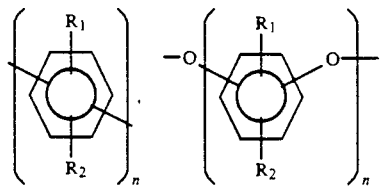

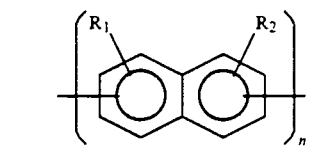

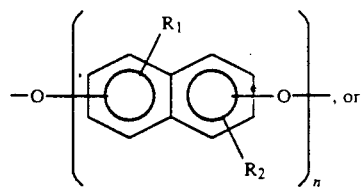

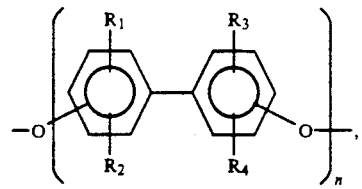

wherein X is chlorine or bromine and $R_1$, $R_2$, $R_3$ and $R_4$ have the aforesaid meanings, and wherein n is an integer from 1 to 6, and wherein $R_5$ and $R_6$ are independently selected from hydrogen, fluorine, chlorine, bromine, alkyl groups having from 1 to 6 carbon atoms, which may be straight chain or branched, or pheny, and wherein n' is an integer from 10 to about 5000, and wherein a and b are integers having a ratio of from about 1 to 100 to 100 to 1 and wherein the a and b moieties can occur randomly or in block form.

* * * * *